United States Patent [19]

Masse et al.

[11] Patent Number: 5,596,721

[45] Date of Patent: Jan. 21, 1997

[54] SCREEN COMMUNICATIONS SYSTEM GRANTING SCREEN MODIFYING REQUESTS IF NO OTHER REQUESTS RECEIVED AFTER FIRST PERIOD OF TIME AND RELEASING REQUESTS AFTER SECOND PERIOD OF TIME

[75] Inventors: Ichiro Masse, Yokohama; Takanori Miyamoto, Fuchu; Takashi Morita, Yokohama; Toshiro Suzuki, Tama; Eiichi Amada, Tokyo, all of Japan

[73] Assignee: Hitachi, Ltd., Tokyo, Japan

[21] Appl. No.: 760,072

[22] Filed: Sep. 13, 1991

[30] Foreign Application Priority Data

Sep. 13, 1990 [JP] Japan .................... 2-242907

[51] Int. Cl.$^6$ ................................ H01J 13/00
[52] U.S. Cl. .................... 395/200.04; 364/284.4; 364/284.3; 364/286.4; 364/DIG. 1
[58] Field of Search ..................... 395/200, 725, 395/325, 550, 650, 200.04; 364/131, 138, 143, 144, 132, 710.14

[56] References Cited

U.S. PATENT DOCUMENTS

| | | | |
|---|---|---|---|
| 4,292,623 | 4/1981 | Eswaran et al. | 340/147 |
| 4,359,731 | 11/1982 | Beauford et al. | 340/147 |
| 4,414,621 | 11/1983 | Bown et al. | 395/200 |
| 4,910,704 | 3/1990 | Gemma | 395/250 |
| 5,107,443 | 4/1992 | Smith et al. | 395/158 |
| 5,206,934 | 4/1993 | Naef, III | 395/200 |
| 5,220,657 | 6/1993 | Bly et al. | 395/425 |

OTHER PUBLICATIONS

Japanese Patent Application Publication (KOKAI) No. 62-269585, Publication (KOKAI) Date: Nov. 24, 1987, Application No. 61-112647, filed May 19, 1986, Applicant: NTT Corp.

Japanese Patent Application Publication (KOKAI) No. 62-138947, Publication No. (KOKAI), Date: Jun. 22, 1987, Application No. 60-279940, filed Dec. 12, 1987, Applicant: DEC.

A. Belady & R. C. Kendall, "Time–Dependent Data–Locking Mechanism" IBM Technical Disclosure Bulletin, Apr. 1977.

*Primary Examiner*—Thomas C. Lee
*Assistant Examiner*—Sang Hui Kim
*Attorney, Agent, or Firm*—Antonelli, Terry, Stout & Kraus

[57] ABSTRACT

A screen communication method and system for communicating screen data between a plurality of interconnected terminal units each having a display part and an input part, wherein each time screen modifying data is input from the display part, each of the terminal units transmits a modifying right request to another terminal unit before transmitting the screen modifying data, and obtains a modifying right under such a condition that each terminal unit receives no screen modifying request from another terminal unit within a predetermined period of time after the transmission of the first modifying right request.

29 Claims, 10 Drawing Sheets

SCREEN COMMUNICATIONS SYSTEM GRANTING SCREEN MODIFYING REQUESTS IF NO OTHER REQUESTS RECEIVED AFTER FIRST PERIOD OF TIME AND RELEASING REQUESTS AFTER SECOND PERIOD OF TIME

BACKGROUND OF THE INVENTION

1. Field of the Invention

This invention relates to a screen communications system that enables quick across to content-of-screen-display modifying information between a plurality of mutually communicable terminal units which display the same contents on the respective display screens.

2. Description of the Related Art

Heretofore the screen communications system of the above-described type is exemplified by a personal computer conference system.

In this known computer conference system, in order to guarantee that the screen displays of all terminal units are identical, a screen modifying right is moved by transferring a modifying right request command and a modifying right moving command. Since these commands are executed according to a store-and-forward protocol similar to the transfer of screen modifying data, a user needs to perform at least two steps of requesting a modifying right and modifying the content of the screen display.

With this prior art, the operation for requesting a modifying right must be performed before actually modifying the content of screen display, which is laborious and time-consuming.

To this end, a graphics conference system has been proposed, such as disclosed in Japanese Patent Laid-Open Publication No. SHO 62-269585, in which the individual terminal unit has a built-in switch so that a modifying right can be moved by receiving a signal requesting the opening of the switch and by transmitting a signal indicating the completion of the opening of the switch.

In this graphics conference system, the terminal unit whose switch is closed has a modifying right; when a screen modifying operation is performed at the terminal unit whose switch is open, the terminal unit transmits a signal requesting the opening of the switch and does not close the switch until a signal indicating the completion of the opening of the switch is returned.

Since only one of the switches will be open at any point in time, it is possible to move a modifying right in a single screen modifying operation, while guaranteeing the uniformity of screen display.

However, until a signal indicating the completion of the opening of the switch is returned after a signal requesting the opening of the switch is transmitted, the terminal unit cannot discriminate whether or not the built-in switch may be closed. As a result, the terminal unit cannot discriminate whether or not it has a modifying right by itself, and the delay time from the screen modifying operation to the reaction of the display of the terminal unit will become large, thus diminishing operation of the terminal unit. Therefore quick movement of a modifying right cannot be achieved.

SUMMARY OF THE INVENTION

It is therefore an object of this invention to provide a screen communications system which enables quick movement of a modifying right, while guaranteeing that the contents of screen display on different terminal units are identical.

In order to accomplish the above object of the invention, a modifying right request is transmitted and that each terminal unit detects by itself whether or not it has a modifying right.

According to a first aspect of the invention, there is provided a screen communications method for communicating screen data between a plurality of interconnected terminal units, each having a display part and an input part, wherein each time screen modifying data is input from the input part, each of the terminal units transmits a modifying right request to another terminal unit before transmitting the screen modifying data, and obtains a modifying right, although no terminal unit receives a screen modifying request from another terminal unit within a predetermined period of time after the transmission of the first modifying right request. Each terminal unit releases the modifying right within a predetermined period of obtaining it, and no screen modifying data is input from the input part.

Preferably the modifying right request transmitting means may transmit a modifying right request without processing it into a packet. According to a second aspect of the invention, there is provided a screen communications system for communicating screen data between a plurality of interconnected terminal units, each having a display part and an input part, the system comprising a first transmitter for transmitting a modifying right request and a second transmitter for transmitting screen modifying data. The second transmitter may perform transmission by using transmission procedures according to a storage-and-forward protocol. The first transmitter may be an analog immediate forward type, the modifying right request being an audio signal having a predetermined frequency. Alternatively, the first transmitter may be a digital immediate forward type, the modifying right request being a binary signal.

Each terminal unit may further include: means for transmitting a modifying right request to another terminal unit each time screen modifying data is input from the input part, before transmitting the screen modifying data; means for receiving a modifying right request transmitted from another terminal unit; means for transmitting the screen modifying data input from the input part; means for receiving the screen modifying data transmitted from another terminal unit; and means for modifying the display contents of the display part based on the screen modifying data input from the input part or that transmitted from another terminal unit.

Further, in order that each terminal unit can detect by itself whether or not it has a modifying right with it, timing to confirm a modifying right and timing to release the modifying right are determined.

Generally, to confirm a modifying right requires confirmation that the plural terminal units are not in simultaneous operation. This requirement can be satisfied by transmitting a modifying right request from a certain terminal unit, then receiving a modifying right from another terminal unit before the modifying right request from the first-named terminal unit arrives at the second-named terminal unit, and monitoring the modifying right request from the second-named terminal unit until this modifying right request arrives at the first-named terminal unit, i.e., during the reciprocating transmission of the modifying right request.

Further, generally, to release a modifying right requires confirmation that the input of screen modifying data is terminated. This requirement can be satisfied by monitoring the input of screen modifying data as long as such input is regarded as being continuous.

For this purpose, each terminal unit may further include: a first measuring means for measuring at least a time period of reciprocating transmission to a modifying right request each time the modifying right request is transmitted; a second measuring means for measuring a time period of input of the screen modifying data to be regarded as a continuous input at the input part; means for confirming a modifying right within a time period of measurement by the first measuring means if the modifying right receiving means receives no modifying right request from another terminal unit; and means for releasing a modifying right within a time period determined by the second measuring means if no screen modifying data is input from the input part.

Further, a timing measurement to confirm that another terminal unit has released a modifying right may be carried out.

Generally, to confirm that another terminal unit has released a modifying right requires a determination as to whether or not the receiving of screen modifying data has been terminated. This requirement can be satisfied by monitoring a modifying right request from another terminal unit only during the time period from the receipt of the modifying right until all of the screen modifying data has been received, i.e., during the total time period of the measuring time of the second measuring means and the transmitting time of the screen modifying data.

For this purpose, each terminal unit further includes: a third measuring means for measuring a total time of the measuring time period of the second measuring means and the transmitting time period of the screen modifying data each time the modifying right request receiving means receives a modifying right request from another terminal unit; and means for confirming, within a time period of measurement by the third measuring means and if the modifying right request receiving means receives no modifying right request from another terminal unit, that another terminal unit has released a modifying right.

Each of the first, second and third measuring means may be a timer.

Since it is possible to discriminate whether or not there is a modifying right with the terminal unit itself from only a modifying right request, the delay time from the screen modifying operation until the display part of the terminal unit reacts becomes smaller, thus causing quick movement of a modifying right. It is therefore possible to display the presence/absence of a modifying right.

In order to determine a timing to confirm that another terminal unit has released a modifying right, each terminal unit further includes: means for transmitting data notifying that the modifying right release confirming means has confirmed the release of a modifying right; means for receiving the release notifying data from another terminal unit; and means for confirming, if the release notifying data receiving means receives the release notifying data from another terminal unit, that another terminal unit has released a modifying right.

In operation, a modifying right request can be transmitted in a reduced time, without being processed into a packet or subjected to error correction which are needed for screen modifying data. Therefore, even if a modifying right request is transmitted after performing the screen modifying operation and even if modification of the content of display on the screen is started after a modifying right is confirmed, a user at the terminal unit will not discern a time difference.

If it is transmitted in an audio signal having a predetermined frequency, a modifying right request can be detected by a filter.

If it is transmitted in a binary signal having a predetermined number of bits, a modifying right request can be detected by a flip-flop.

Further, since the individual terminal unit can determine by itself a timing to confirm a modifying right and a timing to release the modifying right, it is possible to reduce the delay time from the screen modifying operation until the display part of the terminal unit reacts, thus realizing an improved degree of operativity.

DETAILED DESCRIPTION OF THE PREFERRED EMBODIMENTS

Several embodiments of this invention will now be described with reference to the accompanying drawings.

Figure 1:
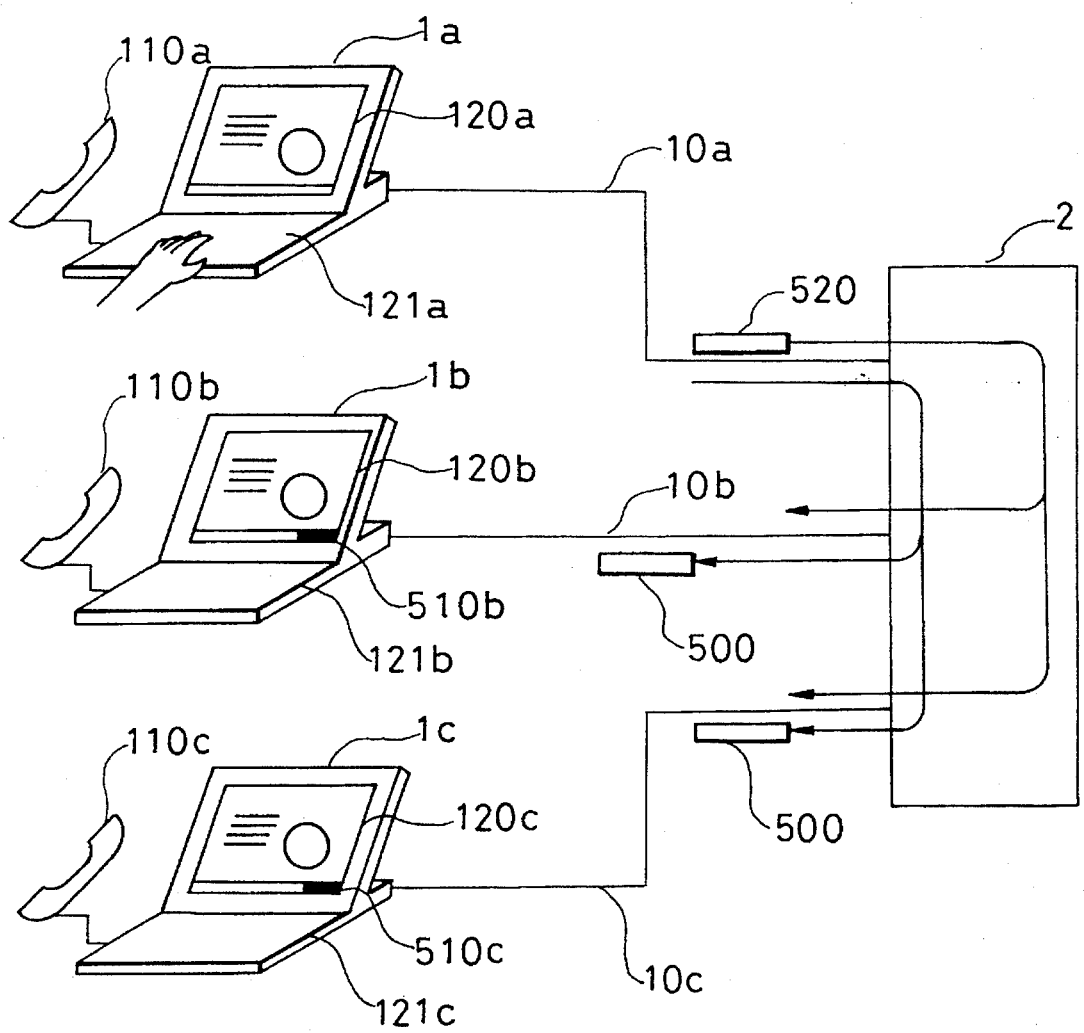
FIG. 1 is a schematic view showing a screen communications system according to a first embodiment of this invention.

FIG. 1 shows a screen communications system according to the first embodiment of this invention.

In FIG. 1, three terminal units 1a, 1b, 1c are connected to an exchanger 2 via three transmission lines 10a, 10b, 10c, respectively. The terminal unit 1a has a display 120a, a keyboard 121a and a telephone 110a. The other terminal units 1b, 1c have the same construction as that of the terminal unit 1a, and the display 120b, 120c of both of the terminal units 1b, 1c displays the content of screen display identical with that on the display 120a of the terminal unit 1a.

When the keyboard 121a is operated, the terminal unit 1a transmits an operating signal 500, for inhibiting any input from the other terminal units 1b, 1c, to the terminal units 1b, 1c via the exchanger 2. In each of the other terminal units 1b, 1c when the operating signal 500 is detected, an input inhibition display 510b, 510c will be displayed on the display screen, and any input from the associated keyboard 121b, 121c will be inhibited.

The terminal unit 1a also transmits screen modifying data 520 to the other terminal units 1b, 1c via the exchanger 2. In each of the other terminal units 1b, 1c, when the screen modifying data 520 is received, the content of screen display of each display 120b, 120c will be changed into the same content as that on the display 120a of the terminal unit 1a.

In the terminal units 1b, 1c, with the lapse of a predetermined time after the operating signal 500 is detected, the input inhibition will be cancelled, and the input inhibition display 510b, 510c on the display screen will be erased.

Figure 2:
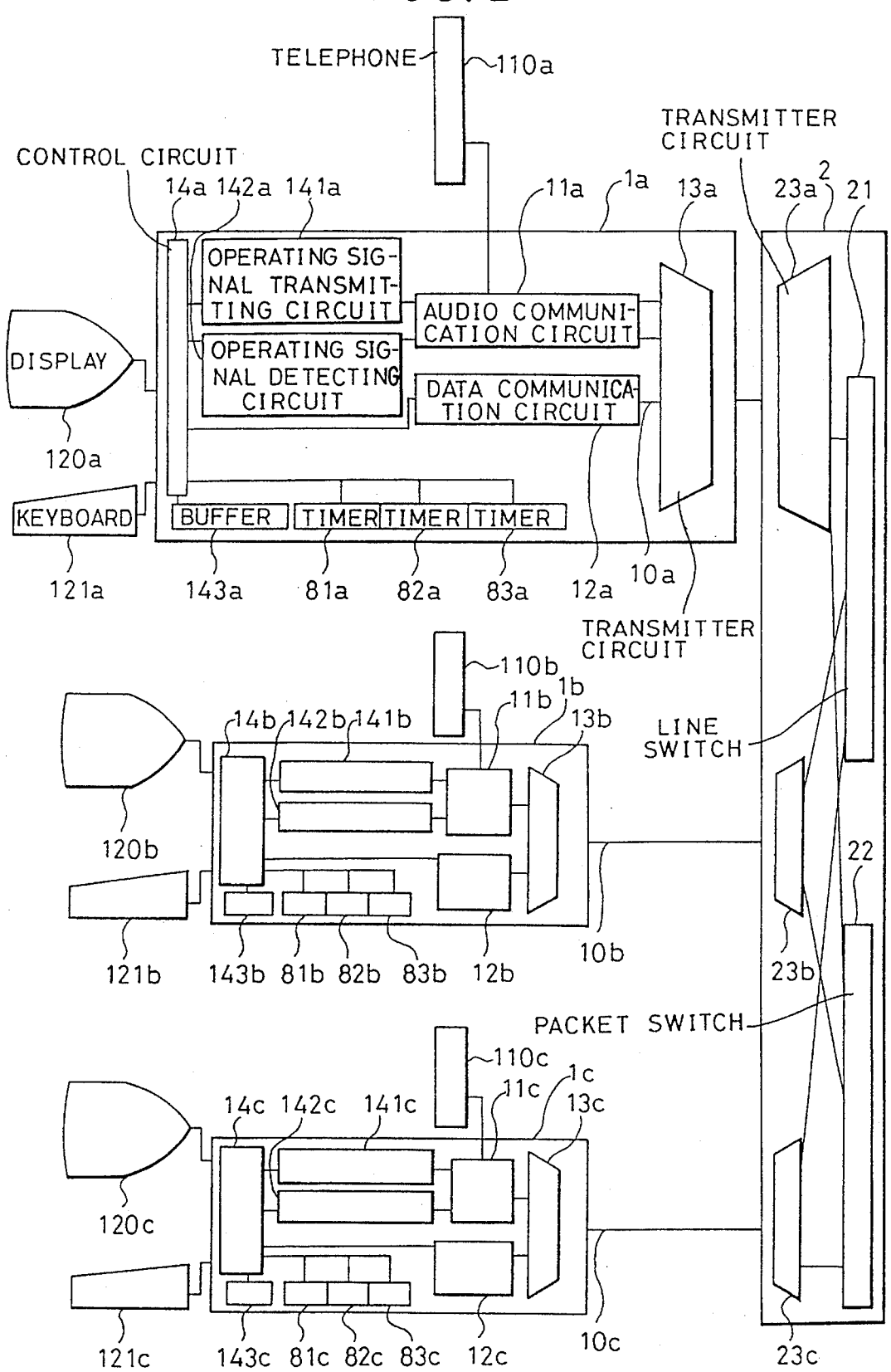
FIG. 2 is a block diagram showing hardware of the system of the first embodiment.

As shown in FIG. 2, the terminal unit 1a includes an audio communication circuit 11a, a data communication circuit 12a, a transmitter circuit 13a for multiplexing the outputs of these two communication circuits 11a, 12a and then transmitting the multiplexed output to the transmission line 10a, and a control circuit 14a. The terminal unit 1a also includes, as external units, a telephone 110a to be connected to the audio communication circuit 11a, and a display 120a and a keyboard 121a which are connected to the control circuit 14a.

The control circuit 14a is connected to the data communication circuit 12a directly and is also connected to the audio communication circuit 11a via an operating signal transmitting circuit 141a, which outputs a tone having a predetermined frequency, and an operating signal detecting circuit 142a, which detects a tone of a predetermined frequency. The transmitting circuit 141a and the detecting circuit 142a are connected in parallel.

Each of the other terminal units 1b, 1c has the same construction as that of the terminal unit 1a.

The exchanger 2 includes a line switch 21 for immediate forward channel and a packet switch 22 for store-and-forward channel. The exchanger 2 also includes three transmitter circuits 23a, 23b, 23c each of which multiplexes the outputs from the two switches 21, 22 and transmits the multiplexed output to the associated transmission line 10a.

In the screen communications system of this embodiment, a call in voice is set between the audio communication circuits 11a, 11b, 11c via the exchanger 2, and a call in packet is set between the data communication circuits 12a, 12b, 12c.

The displays 120a, 120b, 120c indicate the same contents by the call in packet.

When the keyboard 121a is operated while the other keyboards 121b, 121c are not operated, the control circuit 14a causes the operating signal transmitting circuit 141a to output an operating signal. The audio communication circuit I 1a totals the operating signal output from the operating signal transmitting circuit 141a and an audio signal output from the telephone 110a and outputs the result to a transmitter circuit 13a.

Further, the control circuit 14a changes the content of the display 120a. In order to change the contents of displays 120b, 120c similarly, screen modifying data is processed into a packet, and the packetted data is output to the transmitter circuit 13a.

Meanwhile, in each of the other terminal units 1b, 1c, when the operating signal detecting circuit 142b, 142c detects the operating signal output from the transmitter circuit 13a via the exchanger 2, the operating signal detecting circuit 142b, 142c outputs a detection signal to the associated control circuit 14b, 14c. The control circuit 14b, 14c ignores the operation of the keyboard 121b, 121c and modifies the content of the display 120b, 120c based on the screen modifying data detected by the data communication circuit 12b, 12c. At that time, even if the keyboard 121b, 121c is operated, the control 14b, 14c does not activate the operating signal transmitting circuit 141b, 141c.

Figure 3:
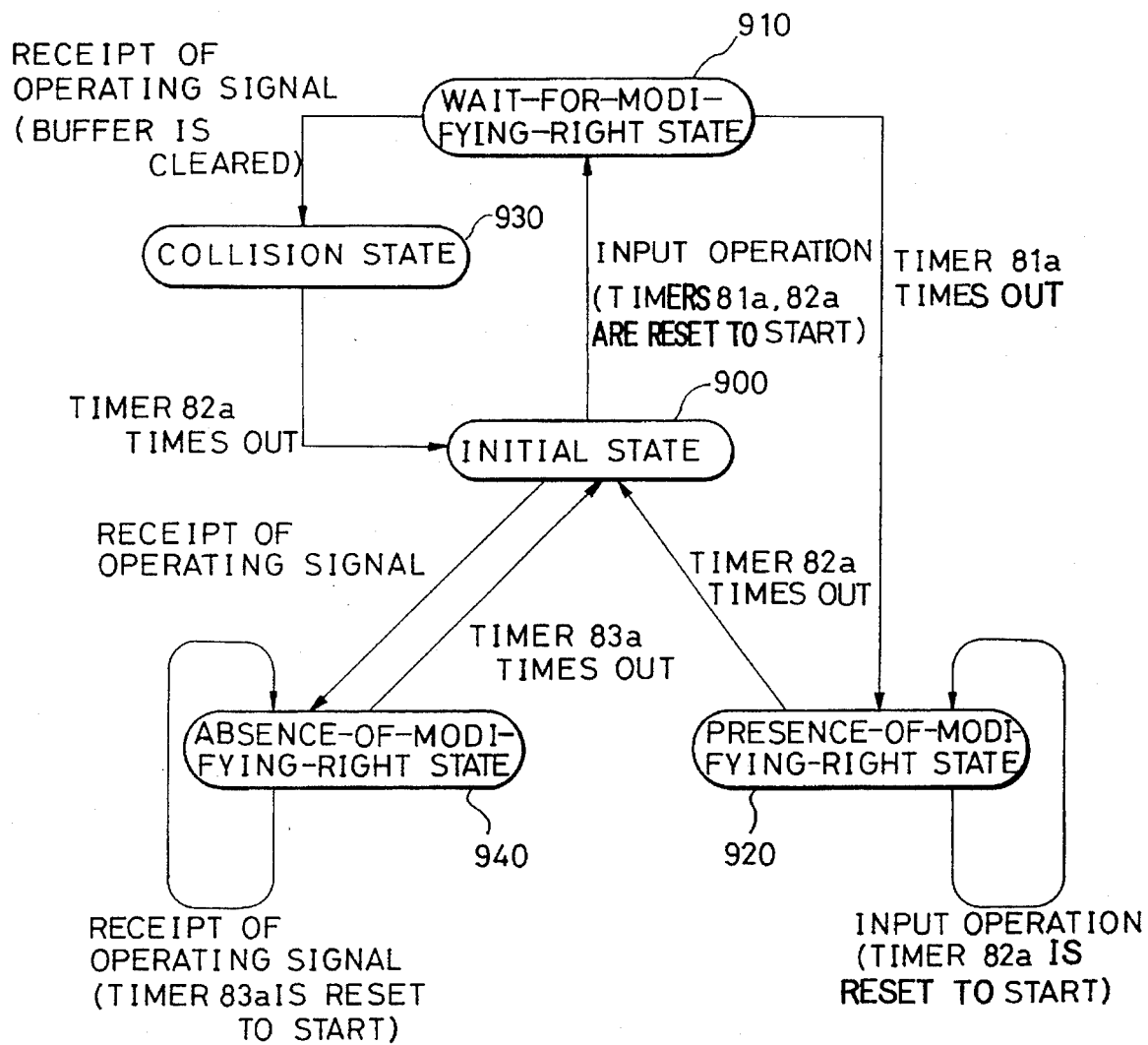
FIG. 3 is a state transition diagram showing the process in which a modifying right is discriminated by a control circuit.

FIG. 3 is a state transition diagram showing the process in which a modifying right is discriminated by the control circuit 14a, 14b, 14c.

As the control circuits 14b, 14c are identical with the control circuit 14a, the manner of discrimination of a modifying right will now be described only in connection with the control circuit 14a.

The control circuit 14a, as shown in FIG. 2, includes three timers 81a, 82a, 83a and a buffer 143a which stores data input from the keyboard 121a.

In the beginning, the control circuit 14a is in an initial state 900. In the initial state 900, when the keyboard 121a is operated, the control circuit 14a causes the operating signal transmitting circuit 141a to output an operating signal, stores in the buffer 143a the data input from the keyboard 121a, causes the timers 81a, 82a to be reset and started, and then transits into a wait-for-modifying-right state 910.

This timer 81a is a timer for detecting whether or not the keyboard 121a has been operated simultaneously with the keyboards 121b and 121c. In the terminal units 1b or 1c, assuming that an operating signal is output as the keyboard 121b or 121c is operated immediately before detecting an operating signal from the keyboard 121a, the value of the timer 81a may be set to be longer than the longer of either the total time of the transmission delay time in transmission of an operating signal from the terminal unit 1a to the terminal unit 1b and the time required to detect an operating signal by the operating signal detecting circuit 142b, or the total time of the transmission delay time in transmission of an operating signal from the terminal unit 1a to the terminal unit 1c and time required to detect an operating signal by the operating signal detecting circuit 142c.

In the wait-for-modifying-right state 910, when the keyboard 121a is operated, the control circuit 14a causes the operating signal transmitting circuit 141a to output an operating signal, stores in the buffer 143a the data input from the keyboard 121a, and causes the timer 82a to be reset and started.

Namely, if no operating signal from the terminal unit 1b, 1c is detected before the timer 81a expires, it may be regarded that the terminal unit 1a has a modifying right, and then the control circuit 14a will transit into a presence-of-modifying-right state 920.

In the presence-of-modifying-right state 920, the control circuit 14a changes the content of the display 120a depending on the content of the buffer 143a and the input from the keyboard 121a, and causes the timer 82a to be reset and started each time the keyboard 121a is operated.

This timer 82a is a timer for guaranteeing a modifying right as long as a series of input from the keyboard 121a continues. The value of the timer 82a may be set to be larger than the value of the timer 81a and longer than the time interval between successive series of input from the keyboards 121a.

When the timer 82a expires, the control circuit 14a will transit into the initial state 900.

In the wait-for-modifying-right state 910, when the operating signal detecting circuit 142a detects an operating signal from the terminal unit 1b or 1c before the timer 81a expires, the control circuit 14a will be cleared to reset the timer 82a to start and will transit into a collision state 930.

In the collision state 930, each time the keyboard 121a is operated and each time the operating signal detecting circuit 142a detects an operating signal, the timer 82a will be reset and started. Also in the collision state 930, any input from the keyboard 121a is invalid, and each time any input from the keyboard 121a is made, the operating signal transmitting circuit 141a will transmit an operating signal. When the timer 82*a* expires, the control circuit 14*a* will transit into the initial state 900.

In the initial state 900, when the operating signal detecting circuit 142*a* detects an operating signal from the terminal unit 1*b* or 1*c*, the control circuit 14*a* will cause the timer 83*a* to be reset and started and will transit into an absence-of-modifying-right state 940.

In the absence-of-modifying-right state 940, since any input from the keyboard 121*a* is invalid, the operating signal transmitting circuit 141 *a* does not operate.

In the absence-of-modifying-right state 940, each time the operating signal detecting circuit 142*a* detects an operating signal, the control circuit 14*a* will cause the timer 83*a* to be reset and start and will change the content of the display 120*a* based on the screen modifying data received by the data communication circuit 12*a*.

The tinier 83*a* is a timer for guaranteeing the transmission delay time in store and forward channel compared to immediate forward channel. The value of the timer 83*a* may be set to be larger than the value of the tinier 82*a* at least by the transmission delay time when transmitting the screen modifying data. As a result, it is possible to exclude any input from the keyboard 121*a* while the content of the display 120*a* is being changed by a series of input from the keyboard 121*b* or 121*c* of the terminal unit 1*b* or 1*c*.

In the absence-of-modifying-right state 940, when the timer 83*a* expires, the control circuit 14*a* will transit into the initial state 900.

In the state other than the absence-of-modifying-right state 940, when it receives the screen modifying data, the terminal unit 1*a* will notify a user that there possibly is a difference in the content of display from the terminal units 1*b*, 1*c*.

FIG. 4 is a sequence diagram corresponding to the state transition diagram of FIG. 3, representing the operation in the first embodiment.

This operation between the terminal units 1*a*, 1*b*, for example, will now be described. In FIG. 4, reference numerals 500–504 designate operating signals; and 520 and 521, screen modifying data.

Figure 4A:
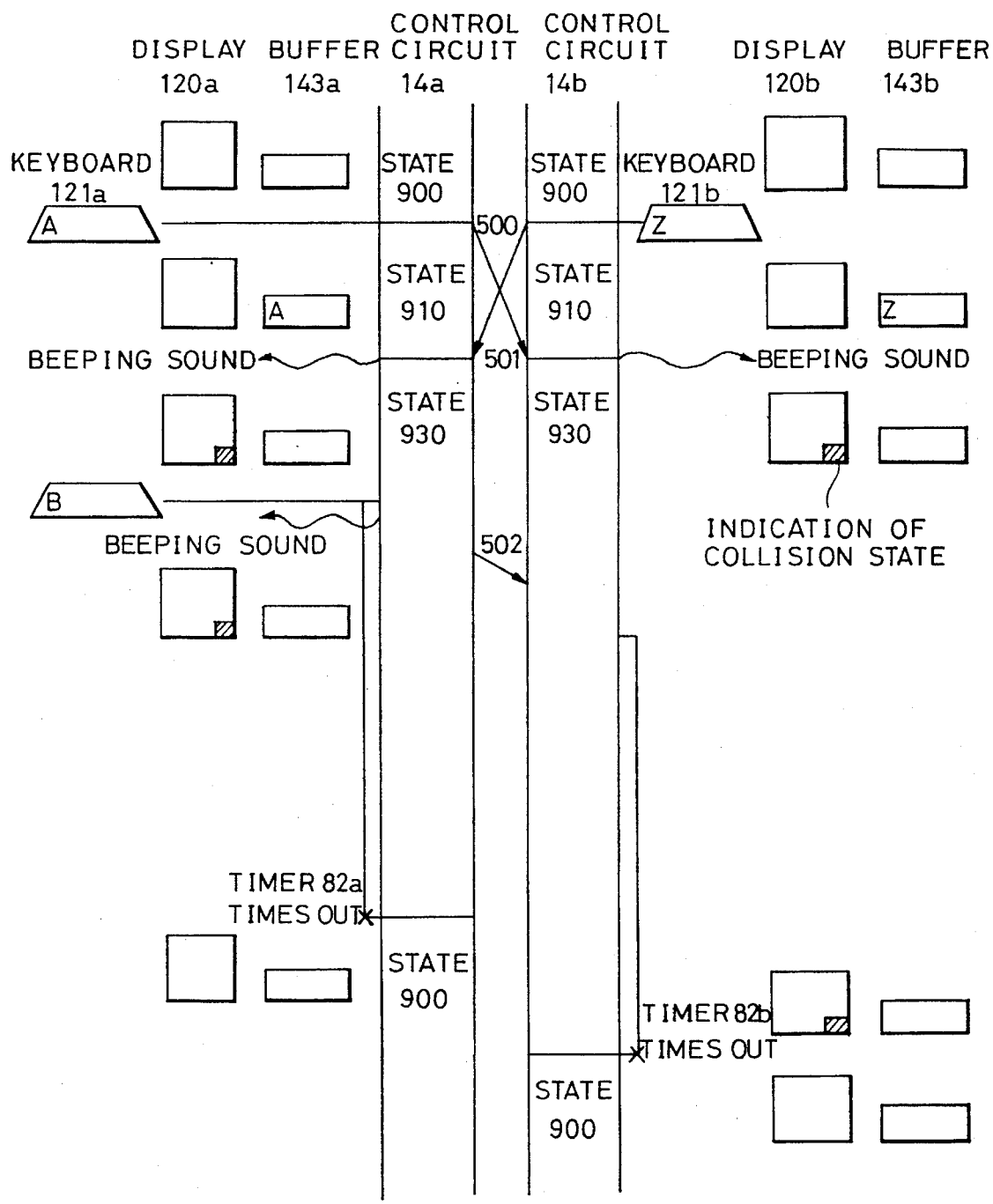
FIG. 4 is a sequence diagram corresponding to the state transition diagram of FIG. 3, representing the operation in the first embodiment.

FIG. 4A shows a sequence when both the keyboards 121*a*, 121*b* are operated.

When the keyboard 121*a* is operated, the control circuit 14*a* will cause the operating signal transmitting circuit 141*a* to output an operating signal 500, will store in the buffer 143*a* the data input from the keyboard 121*a*, will cause the timers 81*a*, 82*a* to be reset and started, and will transit from the initial state 900 into the wait-for-modifying-right state 910.

When the keyboard 121*a* is operated before the control circuit 14*a* detects the operating signal 500, the control circuit 14*b* will cause the operating signal transmitting circuit 141*b* to output an operating signal 500, will store in the buffer 143*b* the data input from the keyboard 121*b*, will cause the timers 81*b*, 82*b* to be reset and started, and will transit from the initial state 900 into the wait-for-modifying-right state 910.

In the wait-for-modifying-right state 910, since they receive respective operating signals 501, 500 before the timers 81*a*, 81*b* expire, both the control circuits 14*a*, 14*b* will clear the contents of the buffers 143*a*, 143*b*, will cause the timers 82*a*, 82*b* to be reset and started and will transit to the collision state 930.

In the collision state 930, any input from the keyboards 121*a*, 121*b* is invalid, and this fact is notified to the operator by beeping and is displayed on the display screen.

Since the control circuits 14*a*, 14*b* transit from the collision state 930 into the initial state 900 when the timers 82*a*, 82*b* time out, the contents of the displays 120*a*, 120*b* will not be changed.

In the first embodiment, the timers 81*a*, 81*b*, 81*c* are used for detecting any collision and are set to more than several tens of ms, for example. This is because the transmission delay time when the maximum-step relay is performed on the telephone network of NTT (Nippon Telephone and Telegram) is about 23 ms. In this case, since the reaction of the display or the occurrence of the beeping sound in response to any input from the keyboards are delayed only by several tens of ms, the operator will not discern a time difference of reaction of the terminal unit.

The timers 82*a*, 82*b*, 82*c* are set to more than several hundreds of ms, and the timers 83*a*, 83*b*, 83*c* are set from about several seconds to severals tens of seconds.

If the transmission delay time of immediate forward channel is more than several hundreds of ms, the operator might feel a time difference of reaction of the terminal unit. In this case, it is preferable to display the content of the buffer on a part of the own display by using, for example, a multi-window.

Figure 4B:
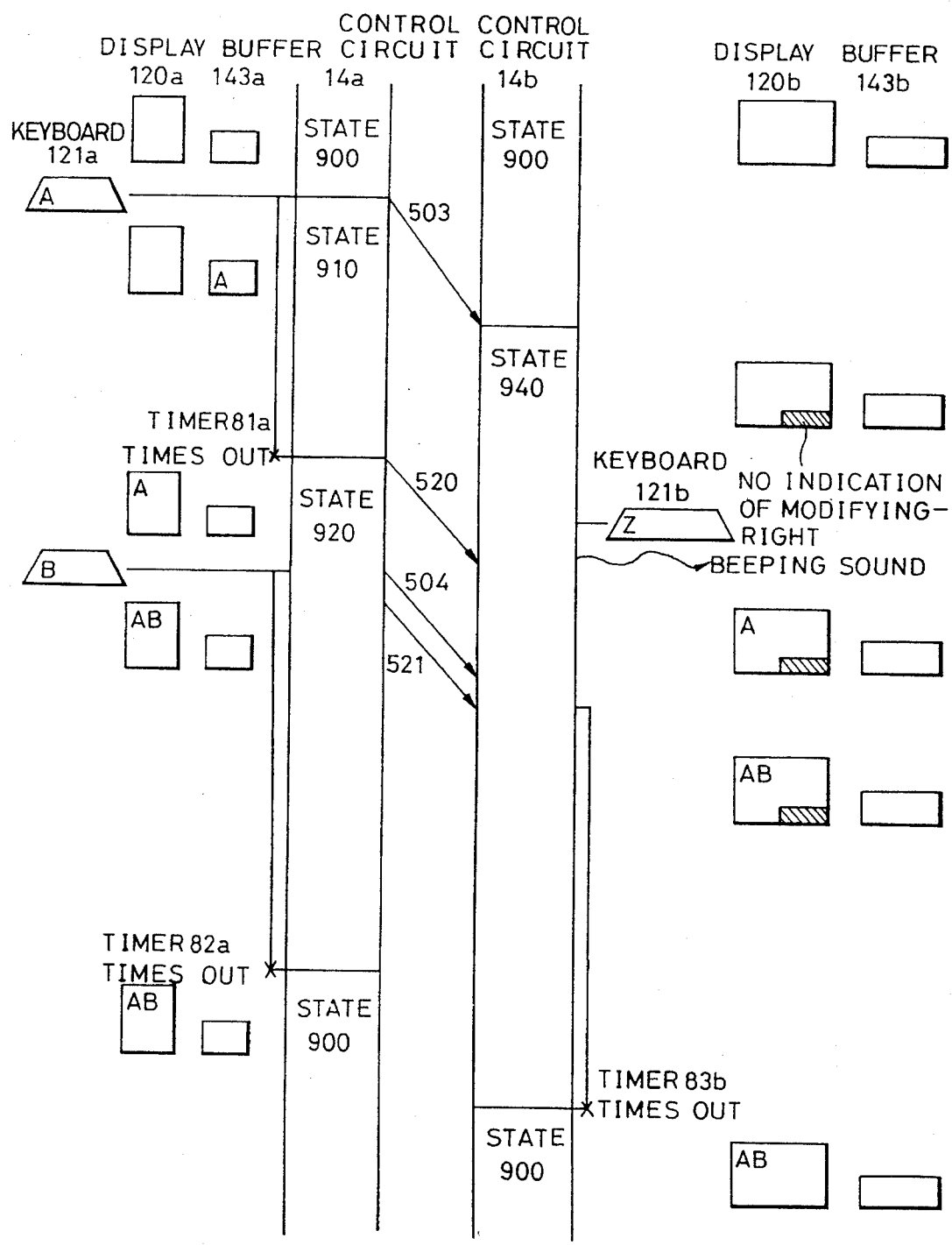

FIG. 4B shows the sequence until the disappearance of a modifying right when only the keyboard 121*a* is operated.

The control circuit 14*a* transits into the presence-of-modifying-right state 920 when the timer 81*a* times out after an operating signal 503 is transmitted, by which time the control circuit 14*b* transits into the absence-of-modifying-right state 940.

In the presence-of-modifying-right state 920, the control circuit 14*a* changes the content of the display 120*a* depending on the content of the buffer 143*a* and the input from the display 120*a* and causes the timer 82*a* to be reset and started each time the keyboard 121*a* is operated. Each time the keyboard 121*a* is operated, the control circuit 14*a* outputs operating signals 503, 504 and also outputs screen modifying data 520, 521 input from the keyboard 121*a*.

Further, in the absence-of-modifying-right state 940, each time the operating signals 503, 504 are detected, the control circuit 14*b* will cause the timer 83*b* to be reset and started and will modify the content of the display 120*b* based on the screen modifying data 520, 521. At that time, since any input from the keyboard 121*b* is invalid, this fact is notified by beeping and is displayed on the display screen.

The control circuit 14*b* transits from the absence-of-modifying-right state 940 into the initial state 900 when the timer 83*b* times out. Meanwhile, the control circuit 14*a* transits from the presence-of-modifying-right state 920 into the initial state 900, when the timer 82*a* expires. Therefore both the two terminal units 1*a*, 1*b* will not assume the absence-of-modifying-right state 920.

In this embodiment, the display of the collision state and the display of the absence-of-modifying-right state are different but they may be identical with each other.

Figure 5:
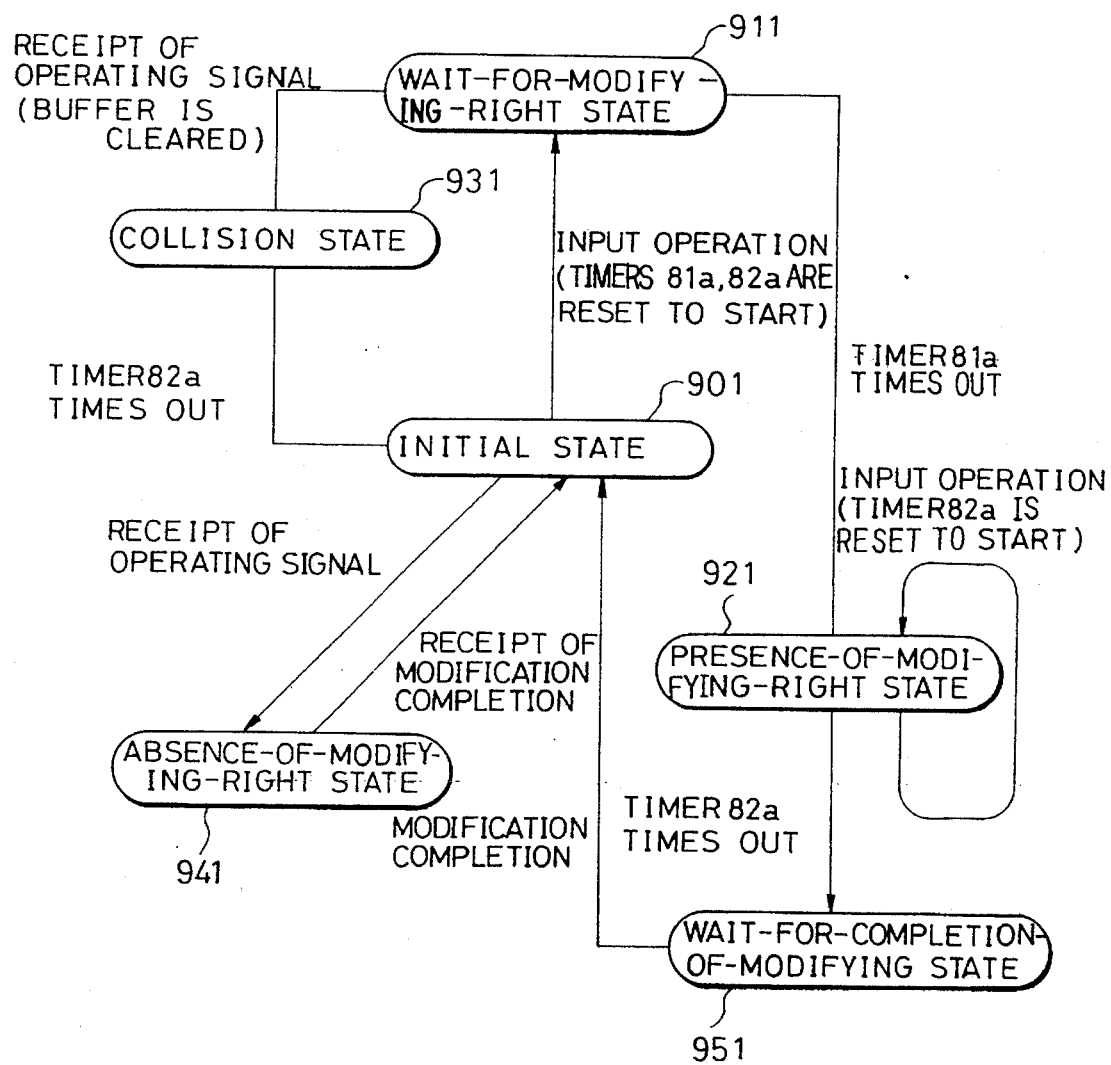
FIG. 5 is a state transition diagram showing the process in which a modifying right is discriminated by a control circuit according to a second embodiment of the invention.

FIG. 5 shows another state transition of the control circuit 14*a* according to the second embodiment of this invention.

In FIG. 5, in the presence-of-modifying-right state 921, when the timer 82*a* expires, the control circuit 14*a* will transit into a wait-for-completion-of-modifying state 951. After an operating signal is transmitted, the control circuit 14*a* can be adopted in the case where the transmission delay time of store-and-forward channel is not guaranteed. Thus, since it is unclear when the screen modifying data is to be received, the modifying right releasing data representing the completion of modifying is notified to the operator.

In FIG. 5, in the presence-of-modifying-right state 921, each time the keyboard 121a is operated, the control circuit 14a will activate the operating signal transmitting circuit 141a and will cause the timer 82a to be reset and started.

Upon completion of modification, i.e., when the timer 82a expires, the control circuit 14a will transit into the wait-for-completion-of-modifying state 951 and will transmit the modifying right releasing data by using the data communication circuit 12a, and then will transit into the initial state 901.

In the absence-of-modifying-right state 941, when the modifying right releasing data is received irrespective of the timer 83a, the control circuit 14a will transit into the initial state 901.

Alternatively, in the wait-for-completion-of-modifying state 951, when the keyboard 121a is operated before transmission of the screen modifying data from the data communication circuit 12a has completed, the control circuit 14a may activate the operating signal transmitting circuit 141a, may cause the tinier 82a to be reset and started and may transit into the presence-of-modifying-right state 921.

Figure 6:
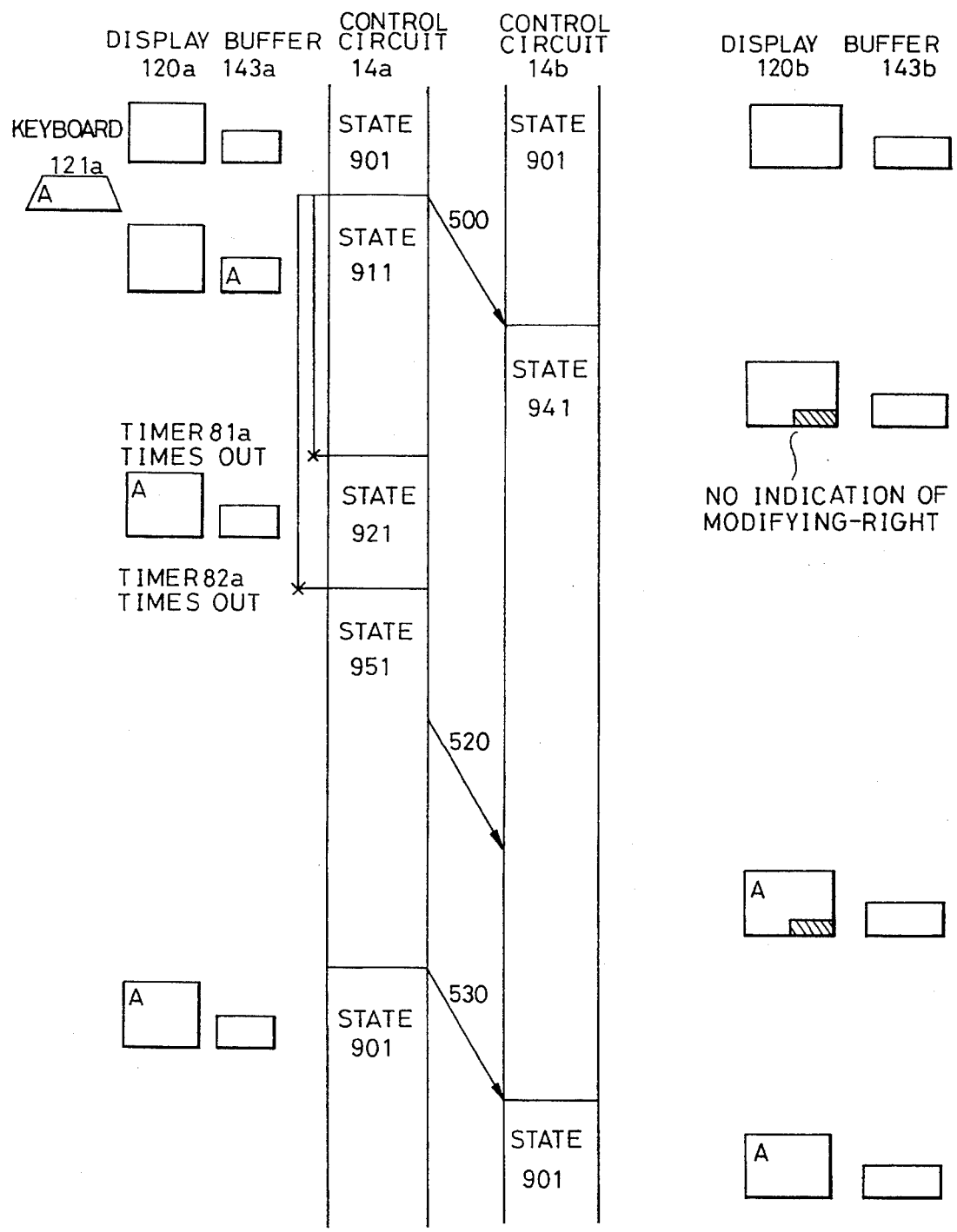
FIG. 6 is a sequence diagram corresponding to the state transition diagram of FIG. 5, representing the operation in the second embodiment.

FIG. 6 shows a sequence corresponding to the state transition of FIG. 5, representing the operation of the second embodiment.

In FIG. 6, when the keyboard 121a is operated, the control circuit 14a will cause the operating signal transmitting circuit 141a to output an operating signal 500, will store in the buffer 143a the data input from the keyboard 121a, will cause the timers 81a, 82a to be reset and started and will transit from the initial state 901 into the wait-for-modifying-right state 911. In the wait-for-modifying-right state 911, when the timer 81a expires, the control circuit 14a will transit into the presence-of-modifying-right state 921.

In the presence-of-modifying-right state 921, each time the content of the display 120a is changed based on the content of the buffer 142a and the input from the keyboard 121a, and each time the keyboard 121a is operated, the control circuit 14a will cause the timer 82a to be reset and started.

When the timer 82a expires, the control circuit 14a will transit into the wait-for-completion-of-modifying state 951 and will soon thereafter transmit the modifying right releasing data 530 and then transit into the initial state 901.

Upon receipt of an operating signal 500, the control circuit 14b transits from the initial state 901 into the absence-of-modifying-right state 941.

In the absence-of-modifying-right state 941, the control circuit 14b modifies the content of the display 120b based on the screen modifying data 520. At that time, since any input from the keyboard 121b is invalid, this fact is notified to the operator by beeping and it is indicated on the display that there is no modifying right.

In the absence-of-modifying-right state 941, upon receipt of the modifying right releasing data 530, the control circuit 14b transits into the initial state 901.

As long as it is in the presence-of-modifying-right state 921 or the wait-for-completion-of-modifying state 951, the screen modifying data 520 may be transmitted at any time. If the keyboard 121a is operated before the data communication circuit 12a has completed transmission of the screen modifying data 530, the control circuit 14a may transit into the presence-of-modifying-right state 921 again.

In the foregoing embodiments, the modifying signal transmitting circuits 141a, 141b, 141c of FIG. 2 are set so as to respectively output operating signals of different frequencies. A plurality of resonance circuits may be provided in the operating signal detecting circuit 142a; by detecting which resonance circuit has detected the received operating signal, it is possible to detect which one of the terminal units 1b, 1c has been operated, and so it is possible to display on the display 120a the name of the operator of the terminal unit.

Figure 7:
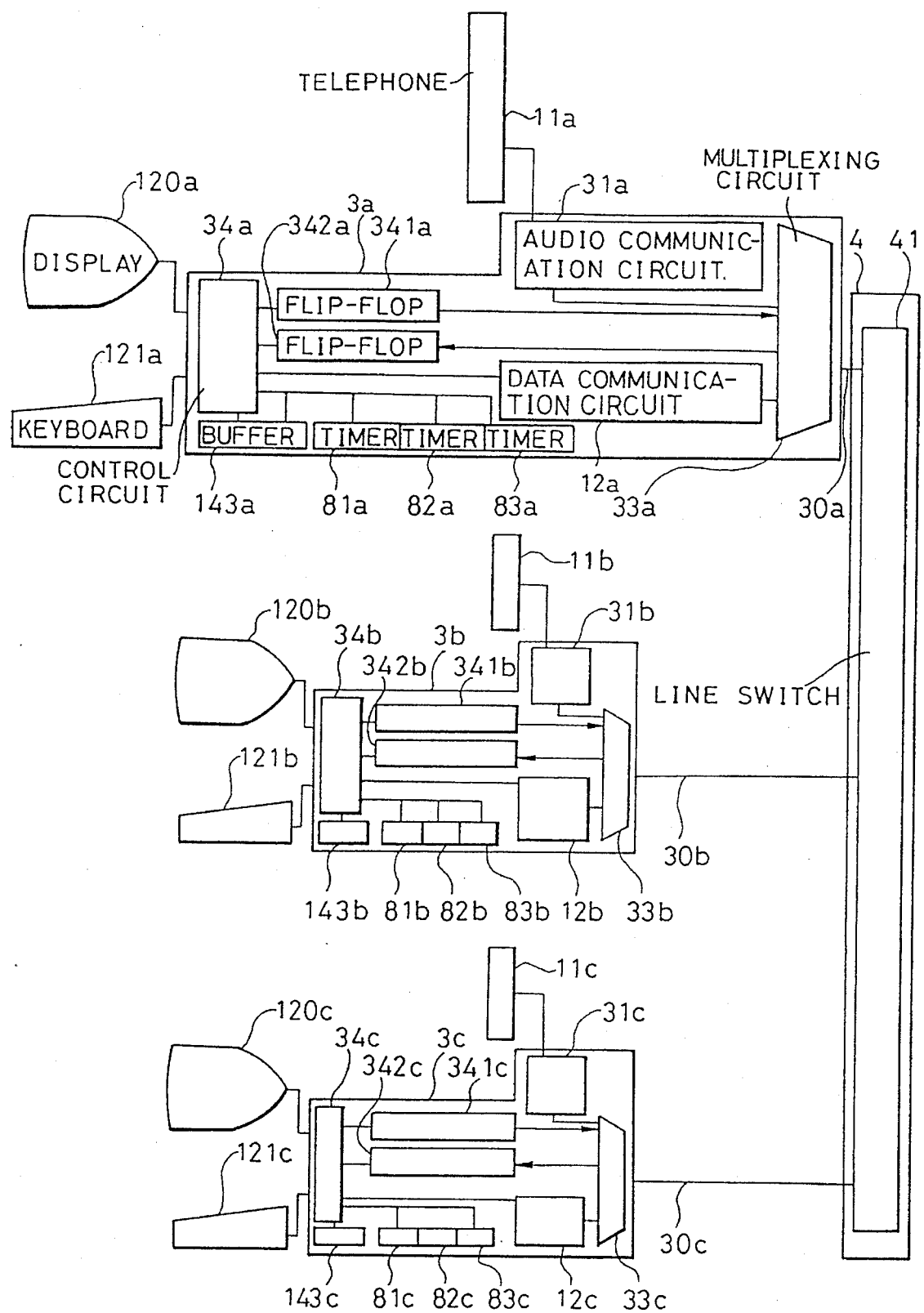
FIG. 7 is a block diagram showing a screen communications system according to a third embodiment.

FIG. 7 shows a screen communications system according to the third embodiment of this invention.

This system generally comprises a plurality of (three in the illustrated embodiment) terminal units 3a, 3b, 3c and an exchanger 4. Each of the terminal unit 3a, 3b, 3c includes, instead of the transmitting circuit 13a, 13b, 13c of the previous embodiments, a multiplexing circuit 33a, 33b, 33c for multiplexing an audio signal, screen modifying data and an operating signal into an immediate forward exchange channel and then transmitting them. Each terminal unit 3a, 3b, 3c also includes, instead of the operating signal transmitting circuit 141a, 141b, 141c of the previous embodiments, a flip-flop 341a, 341b, 341c and, instead of the detecting circuit 142a, 142b, 142c of the previous embodiments, a flip-flop 342a, 342b, 342c.

The manner of state transition of control circuits 34a, 34b, 34c in the terminal units 3a, 3b, 3c is identical with that described in connection with FIG. 3.

When the control circuit 34a is in the wait-for-modifying-right state 910, the presence-of-modifying-right state 920 or the collision state 930, the flip-flop 341a is set to "1".

In this embodiment, a bit multiplexing method can be considered for use as a method of multiplexing an operating signal into an immediate forward channel. To perform this method, the flip-flops 341a, 341b, 341c and the flip-flops 342a, 342b, 342c are used. This bit multiplexing method is exemplified by a method of transmitting immediate channel data of, for example, 64 kb/s 8 bits for every 8 kHz and allocating 7 bits to an audio signal and 1 bit to an operating signal.

Figure 8:
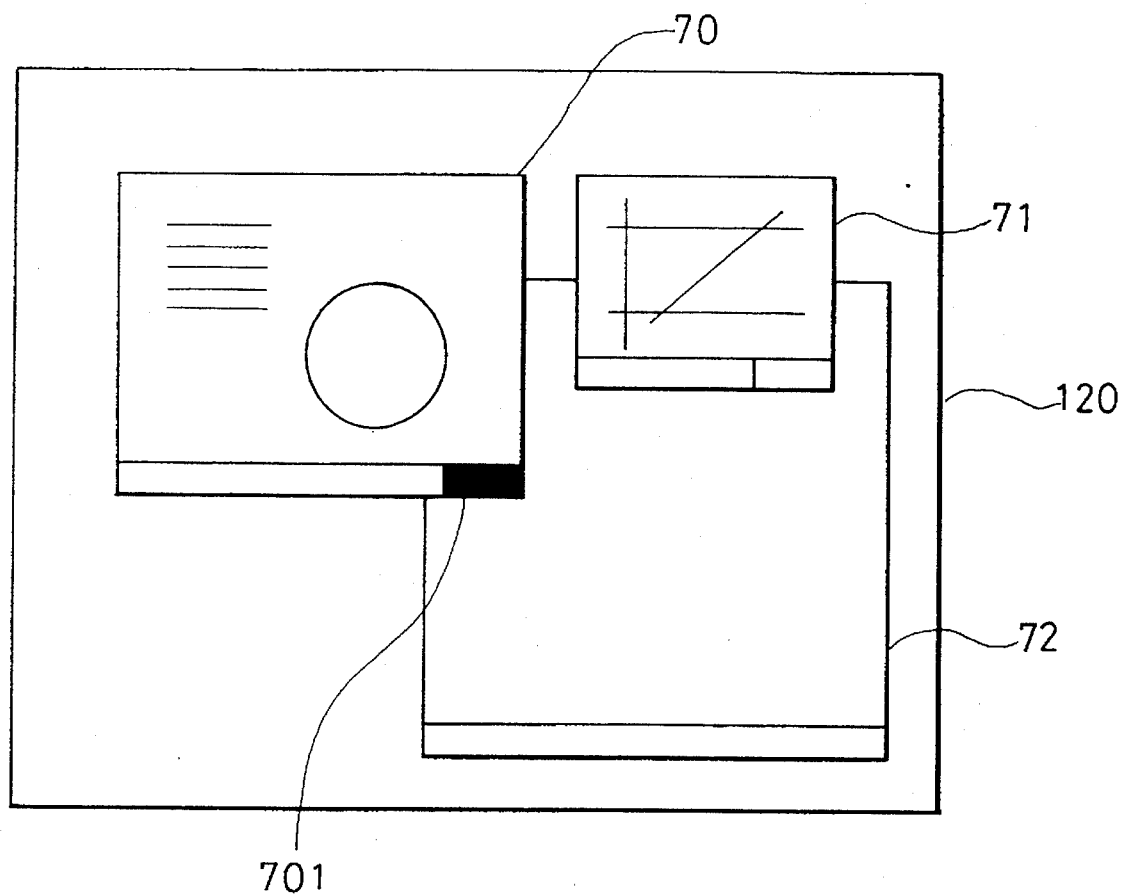
FIG. 8 is a schematic view showing an example of display screen according to a fourth embodiment.
Figure 9:
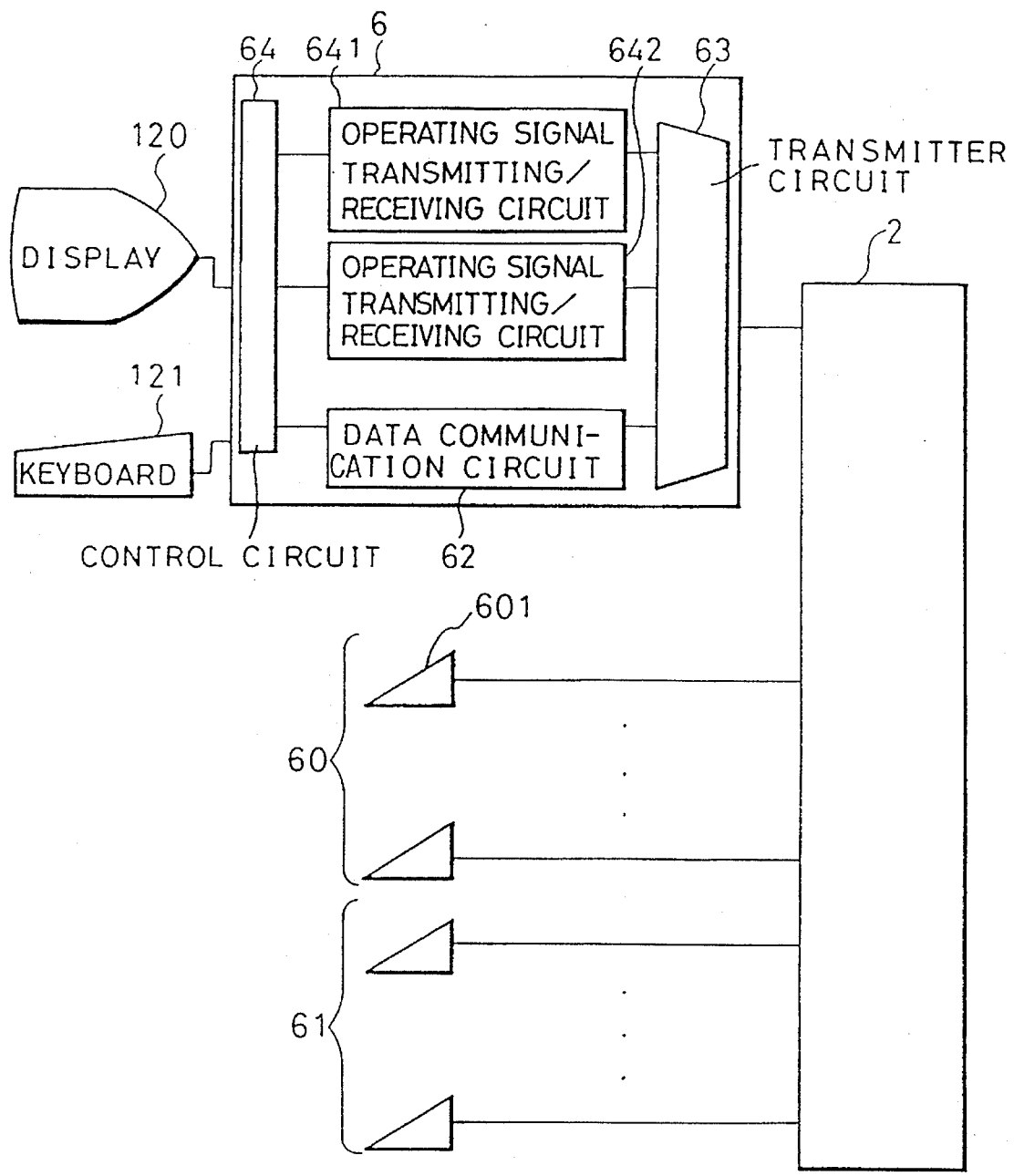
FIG. 9 is a block diagram showing a screen communications system according to the fourth embodiment.

FIG. 8 shows an example of screen display according to the fourth embodiment of this invention, and FIG. 9 shows the hardware of the screen communications system of the fourth embodiment.

As shown in FIG. 8, the display 120 is divided into a plurality of (three in the illustrated embodiment) areas 70, 71, 72; the area 70 is shared with a terminal unit group 60, the area 71 is shared with a terminal unit group 61, and the area 72 is used only by the terminal unit 6 itself.

The terminal unit 6 has operating signal transmitting and receiving circuits 641,642 connected to the terminal unit groups 60, 61 via an exchanger 2.

When an operating signal is transmitted, as a terminal unit 601 of the terminal unit group 60 is operated, an operating signal receiving circuit 641 will detect this operating signal, and a control circuit 64 will cause an input inhibition display 701 of the area 70. The control circuit 64 will cause the cursor to move out of the area 70 and will not allow the cursor to move into the area 70 while any input is inhibited.

At that time, if a screen modification is made within the area 71, the control circuit 64 will cause the operating signal transmitting and receiving circuit 642 to transmit an operating signal to inhibit any input to the terminal unit group 61.

Thus in this embodiment, the multi-window method is adopted so that a screen communications system can be constructed for each window. Since a single window is only for the terminal unit itself, it is convenient to use.

According to this invention, since by only operating the keyboard each terminal unit can discriminate by itself whether or not there is a modifying right, with guaranteeing that the contents of screen displays of the individual terminal units are identical, the delay time from operating the terminal unit until the operator's own display reacts can be reduced. Therefore it is possible to quickly move a modifying right so that the operativity of the terminal unit can be improved.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A screen communications method for communicating screen data between a plurality of interconnected terminals, each of said terminals having a display part and an input part, said method comprising the steps of:

connecting each of said plurality of terminals to a first transmitter which transmits information via a non-delay service switching system and to a second transmitter which transmits information via a storage-and-forward switching system so that information from any one of said terminals may be transmitted to another terminal or to other remaining terminals through said first transmitter, and so that information from said any one of said terminals may be transmitted to said another terminal or to said other remaining terminals through said second transmitter;

upon input of screen modifying data into said any one of said terminals from said input part of said other remaining terminals, performing the following steps, in said anyone of said terminals, of:

transmitting a modifying right request to any other remaining terminal through said first transmitter;

detecting whether or not any modifying right request which has been transmitted from any other terminal has been received through said first transmitter within a first predetermined period of time, transmitting said input screen modifying data to said another terminal or to said other remaining terminals through said second transmitter when no other modifying right request has been received, and releasing said modifying right of said any one of said terminals when no screen modifying data has been input from said input part of said other remaining terminals for a second predetermined period of time.

2. A screen communications method according to claim 1, wherein said modifying right is transmitted through a non-delay service switching system, wherein said first predetermined time period is longer than a time period required for a modifying right request to reach any of said other terminals, wherein said screen modifying data is transmitted through a storage-and-forward protocol, and wherein said second predetermined time period is longer than said first predetermined time period.

3. A screen communications system for communicating screen data between a plurality of interconnected terminals, each terminal having a display part and an input part, said system comprising:

a first transmitter for transmitting information via a non-delay-service-switching system, said first transmitter being connected to each of said plurality of terminals for transmission of information from any one of said terminals to another terminal or to other remaining terminals; and a second transmitter for transmitting information via a storage- and forward switching system, said second transmitter being connected to each of said terminals for transmission of information from said any one of said terminals to said another terminal or to said other remaining terminals;

wherein each of said plurality of terminals comprises:

first transmitting means for transmitting a modifying right request to said another terminal or to said other remaining terminals through said first transmitter when an input operation is made at said input part for modifying the screen, receiving means for receiving modifying right requests from any of said other remaining terminals through said first transmitter, detecting means for detecting whether or not said receiving means for receiving modifying right requests receives any modifying right requests within a first predetermined period of time after transmission of the modifying right request from said first transmitting means, second transmitting means for transmitting said input screen modifying data from said one terminal to said another terminal or to said other remaining terminals through said second transmitter if no modifying right requests are received from any of said other remaining terminals within said first predetermined period of time, and releasing means for releasing the modifying right of said one terminal when no screen modifying data has been input from said input part for a second predetermined period of time.

4. A screen communication system according to claim 3, further comprising:

means for detecting, when said means for receiving modifying right request receive a modifying write request from said any of said other remaining terminals, whether or not said receiving means has received the modifying right request within a third predetermined period of time which corresponds to the second predetermined period of time added to a time period required for screen modifying data transmission through said second transmitter; and confirming means for confirming that any of said remaining terminals has released the modifying right.

5. A screen communications system for communicating screen data between a plurality of interconnected terminals, each terminal having a display part and an input part, said system comprising:

a first transmitter for transmitting information via a non-delay-service-switching system, said first transmitter being connected to each of said plurality of terminals for transmission of information from any one of said terminals to another terminal or to other remaining terminals; and a second transmitter for transmitting information via a storage- and forward switching system, said second transmitter being connected to each of said terminals for transmission of information from said any one of said terminals to said another terminal or to said other remaining terminals;

wherein each of said plurality of terminals comprises:

first transmitting means for transmitting a modifying right request to said another terminal or to said other remaining terminals through said first transmitter when an input operation is made at said input part for modifying the screen, receiving means for receiving modifying right requests from any of said other remaining terminals through said first transmitter, detecting means for detecting whether or not said receiving means for receiving modifying right requests receives any modifying right requests within a first predetermined period of time after transmission of the modifying right request from said first transmitting means, second transmitting means for transmitting said input screen modifying data from said one terminal to said another terminal or to said other remaining terminals through said second transmitter if no modifying right requests are received from any of said other remaining terminals within said first predetermined period of time, releasing means for releasing the modifying right of said one terminal when no screen modifying data has been input from said input part for a second predetermined period of time, a third transmitter and a fourth transmitter connected to each of said plurality of terminals, both of said third and fourth transmitters independently transmitting information therethrough, said third transmitter including communication media having a shorter delay time for data transmission than said fourth transmitter, means for transmitting a modifying right request to said another terminal or to said other remaining terminals each time screen modifying data is input from said input part, means for receiving a modifying right request transmitted from said transmitting means of any of said other remaining terminals, means for transmitting said screen modifying data input from said input part, means for receiving screen modifying data transmitted from any of said other remaining terminals, means for modifying the content of display of said display part based on said screen modifying data input from said input part or that transmitted from any of said other remaining terminals, control means for controlling receiving and releasing of modifying right requests and transmission and reception of modifying data, said control means comprising:

means for confirming a modifying right in said terminal when no modifying requests are received from any of said other remaining terminals when a first predetermined time period lapses after transmission of a modifying right request therefrom, means for releasing said modifying right when a second predetermined time period lapses after confirming said modifying right when no data is input from said input part, and means for transmitting screen modifying data from said input part to said means for transmitting screen modifying data after confirming said modifying right.

6. A screen communications system according to claim 5, wherein each of said terminals comprises a data communication circuit for transmitting screen modifying data by a packet to said another terminal or to said other remaining terminals, said second transmitter comprises a switch for conducting a transmission procedure based on a storage-and-forward protocol wherein said transmitted screen modifying data is stored for further transmission to said another terminal or to said other remaining terminals, and said control means further comprises invalidation means for invalidating any input from said input part during transmission of screen modifying data from said other remaining terminals, said invalidation means including a third predetermined time period that is longer than transmission delay-time for transmission of screen modifying data between any of said terminals, and for cancelling invalidation of input from said input part after the third predetermined time period has lapsed after transmission of the screen modifying data.

7. A screen communications system according to claim 5, wherein each of said terminals comprises:

an optional signal transmission circuit for outputting a modifying right request in the form of an audio signal having a predetermined frequency; and an audio communication circuit for multiplexing said audio signal with another audio signal and outputting said audio signal which indicates said modifying right request output from said operational signal transmission circuit, said first transmitter comprising a circuit switch which instantly transmits an audio signal transmitted from any of said terminals to said another terminal or to said other remaining terminals, said first predetermined time period being longer than a time period necessary for a modifying right request transmitted from said any one of said terminals to reach said another terminal or said other remaining terminals, and said second predetermined time period being longer than said first predetermined time period.

8. A screen communications system according to claim 7, wherein intervals between input operations indicates different series of input.

9. A screen communications system according to claim 5, wherein each of said terminals comprises:

a circuit which outputs said modifying right request in the form a binary signal; and a multiplexing circuit for outputting said modifying right request in said binary signal after bit-multiplexing said binary signal with other binary signals, said first transmitter comprising a circuit switch which instantly transmits said bit-multiplexed signal from said any one of said terminals to said another terminal or to said other remaining terminals, said first predetermined time period being longer than a time period necessary for a modifying right request transmitted from said any one of said terminals to reach said another terminal or said other remaining terminals, and said second predetermined time period being longer than said first predetermined time period.

10. A screen communications system according to claim 9, wherein intervals between input operations indicates different series of input.

11. A screen communication system according to claim 5, further comprising:

means for detecting whether or not said receiving means receives any modifying right request within a third predetermined period of time which is set every time said means for receiving modifying right request receives a modifying right request from said any of said other remaining terminals, said third predetermined period of time corresponds to said second predetermined period of time added to a time period required for screen modifying data transmission through said second transmitter; and confirming means for confirming that any of said remaining terminals has released the modifying right.

12. A screen communications system for communicating screen data between a plurality of interconnected terminals, each of said terminals having a display part and an input part, said system comprising:

a first transmitter for transmitting therethrough a modifying right request from any one of said terminals to another terminal or to other remaining terminals; and a second transmitter for transmitting therethrough screen modifying data from said any one terminal to said another terminal or to said other remaining terminals;

wherein each terminal comprises:

means for transmitting a modifying right request to said another terminal or to said other remaining terminals each time screen modifying data is input from said input part, means for receiving a modifying right request transmitted from said transmitting means of any of said other remaining terminals, means for confirming that said terminal has the modifying right, when said means for receiving modifying right requests has not received a modifying right request within a first predetermined period of time after said means for transmitting a modifying right request has transmitted the modifying right request to said another terminal or to said other remaining terminals through said first transmitter, means for transmitting said screen modifying data input from said input part after confirming that said terminal has the modifying right, means for receiving screen modifying data transmitted from said any of said other remaining terminals, means for modifying the content of display of said display part based on said screen modifying data input from said input part received by said means for receiving screen modifying data, first measuring means for measuring a time period for reciprocal transmission of a modifying right request from said any of said other remaining terminals each time said modifying right request is transmitted to said another terminal or to said other remaining terminals, second measuring means for measuring a time period for a continuous, uninterrupted input of said screen modifying data at said input part, means for confirming a modifying right within a time period of measurement by said first measuring means if said modifying right receiving means receives no modifying right request from any one of said plurality of terminals and means for releasing a modifying right within a time period of measurement by said second measuring means of no screen modifying data is input from said input part.

13. A screen communications system according to claim 12, wherein each of said terminals further comprises:

means for transmitting data notifying that said modifying right release confirming means has confirmed the release of a modifying right;

means for receiving said release notifying data from any of said other remaining terminals; and means for confirming, if said release notifying data receiving means receives said release notifying data from any of said other remaining terminals, that another terminal has released a modifying right.

14. A screen communications system for communicating screen data between a plurality of interconnected terminals, each of said terminals having a display part and an input part, said system comprising:

a first transmitter for transmitting therethrough a modifying right request from a particular one of said terminals to another terminal or to other remaining terminals; and a second transmitter for transmitting therethrough screen modifying data from said any one terminal to said another terminal or to said other remaining terminals when said particular terminal determines that no modifying request from said any other remaining terminals has been received thereat within a predetermined amount of time after transmitting said modifying right request;

wherein each terminal further comprises:

means for transmitting a modifying right request to said another terminal or to said other remaining terminals each time screen modifying data is input from said input part, means for receiving a modifying right request transmitted from said transmitting means of any of said other remaining terminals, means for transmitting said screen modifying data input from said input part, means for receiving screen modifying data transmitted from said any of said other remaining terminals, means for modifying the content of display of said display part based on said screen modifying data input from said input part or received by said means for receiving screen modifying data, first measuring means for measuring a predetermined time period every time said modifying right request is transmitted to said another terminal or to said other remaining terminals, said predetermined time period being necessary for a modifying right request transmitted from any of said other remaining terminals to be received at any other of said remaining terminals, second measuring means for measuring a time period for a continuous, uninterrupted input of said screen modifying data at said input part, means for confirming a modifying right if, within a time period of measurement by said first measuring means, said modifying right receiving means receives no modifying right request from any of said other remaining terminals, means for releasing a modifying right within a time period of measurement by said second measuring means if no screen modifying data is input from said input part, third measuring means for measuring a total time of the measured time period of said second measuring means and the transmitting time period of said screen modifying data each time said modifying right request receiving means receives a modifying right request from any of said other remaining terminals, and means for confirming, within a predetermined time period measurement by said third measuring means, if said modifying right request receiving means receives no modifying right request from any of said other remaining terminals that another of said other remaining terminals has released a modifying right.

15. A screen communications system according to claim 14, wherein a time period measured by said first measuring means is a period of time necessary for reciprocal transmission of a modifying right request through said first transmitter.

16. A terminal unit having an input part and a display part for use as one of a plurality of terminal units, each terminal unit being interconnected to a first and a second transmitter, in a screen communications system, said terminal unit comprising:

first means for transmitting a modifying right request to another terminal unit or to other remaining terminal units through said first transmitter when an input operation is made in said input part for modifying said screen;

means for receiving a modifying right request transmitted from any of said remaining terminal units through said first transmitter;

means for detecting whether or not said means for receiving a modifying right request has received a modifying right request from any of said other remaining terminal units within a first predetermined time period, after transmitting a modifying right request from said transmitting means;

second means for transmitting said screen modifying data through said second transmitter from said terminal unit to said another terminal unit or to said other remaining terminal units if no modifying right request from any of said other remaining terminal units has been received within said first predetermined time period;

means for receiving said screen modifying data transmitted from any of said other remaining terminal units;

means for modifying contents of said display based on the input from said input part or screen modifying data transmitted from any of said other remaining terminal units; and first measuring means for measuring a first predetermined period of time in which a modifying right request transmitted from any of said other remaining terminal units is received at any other of said other remaining terminal units, wherein said first transmitter includes a communication system having a shorter information transmission delay compared to said second transmitter.

17. A terminal unit according to claim 16, wherein said modifying right request transmitting means transmits a modifying right request through a non-delay service switching system.

18. A terminal unit according to claim 16, where-in said modifying right request transmitting means and said modifying right request receiving means respectively transmit and receive a modifying right request in first transmission procedures, and said screen modifying data transmitting means and said screen modifying data receiving means respectively transmit and receive screen modifying data in second transmission procedures.

19. A terminal unit according to claim 16, wherein said first measuring means measures said first predetermined period of time whenever a modifying right request is transmitted to said another terminal unit or said other remaining terminal units and said first predetermined period of time is a time period necessary for a modifying right request transmitted from any one of said terminal units to be received at said another terminal unit or said other remaining terminal units, said terminal unit further comprising:

means for detecting whether or not a further input operation is made within a second predetermined period of time when an input operation has been made at an input part;

second measuring means for measuring the second predetermined period of time to be reset for every input operation of said screen modifying data from said input part, said second predetermined period of time having an intermission after an input operation has been made;

releasing means for releasing a modifying right when no further input operation has been made within said second predetermined period of time;

means for detecting whether or not said means for receiving modifying right requests receives a modifying right request from any of said other remaining terminal units within a third predetermined period of time;

means for confirming that any of said other remaining terminal units which had a modifying right has released the modifying right when no modifying right request has been received from any of said other remaining terminal units within said second predetermined period of time; and third measuring means for measuring a third predetermined period of time to be reset for every receipt of a modifying right request from any of said other remaining terminal units, said third predetermined period of time corresponding to said second predetermined period of time added to a period of time required for transmission of screen modifying data through said second transmitter.

20. A terminal unit having an input part and a display part for use as one of a plurality of terminal units, each terminal unit being interconnected to a first transmitter and a second transmitter, in a screen communications system, said terminal unit comprising:

first means for transmitting a modifying right request to another terminal unit or to other remaining terminal units through said first transmitter when an input operation is made in said input part for modifying said screen;

means for receiving a modifying right request transmitted from any other remaining terminal units through said first transmitter;

means for detecting whether or not said means for receiving a modifying right request has received a modifying right request from any of said other remaining terminal units within a first predetermined time period, after transmitting a modifying right request from said transmitting means;

second means for transmitting said screen modifying data through said second transmitter from said terminal unit to said another terminal unit or to said other remaining terminal units if no modifying right request from any of said other remaining terminal units has been received within said first predetermined time period;

means for receiving said screen modifying data transmitted from any of said other terminal units;

means for modifying contents of the display based on the input from said input part or the screen modifying data transmitted from any of said other remaining terminal units;

first measuring means for measuring said first predetermined time period whenever said modifying right request is transmitted to another terminal unit or to other remaining terminal units, said first predetermined time period being necessary for a modifying right request transmitted from any of said terminal units to be received at said another terminal or at said other remaining terminal;

second measuring means for measuring a time period for a continuous, uninterrupted input of said screen modifying data at said input part;

means for releasing a modifying right if, within a time period of measurement by said second measuring means, if no screen modifying data is input from said input part;

third measuring means for measuring a total time of the measured time period of said second measuring means and the transmitting time period of said screen modifying data each time said modifying right receiving means receives a modifying right request from any of said other remaining terminal units; and means for confirming that another of said plurality of terminal units has released a modifying right if, within a predetermined time period measurement by said third measuring means, said modifying right request receiving means receives no modifying right request from any of said other remaining terminal units.

21. A terminal unit according to claim 20, further comprising:

means for transmitting data notifying that said modifying right release confirming means has confirmed the release of a modifying right;

means for receiving said release notifying data from any of said other remaining terminal units; and means for confirming, if said release notifying data receiving means receives said release notifying data from said another terminal unit, that said another terminal has released a modifying right.

22. A terminal unit according to claim 20, further comprising means for displaying on said display part a content indicating the presence of a modifying right if said modifying right confirming means confirms said modifying right.

23. A terminal unit according to claim 20, wherein said display part displays on display part a content indicating the absence of a modifying right if said modifying right request receiving means receives the modifying right request.

24. A terminal unit according to claim 20, wherein a time period measured by said first measurement means is a period of time necessary for reciprocal transmission of a modifying right request through said first transmitter.

25. A screen communications method for communicating screen data between a plurality of interconnected terminal units each having a display part and an input part, said method comprising the steps of:

selectively assuming, in each of said terminal units, an initial state, an absence-of-modifying-right state, a presence-of-modifying-right state, a wait-for-modifying-right state or a collision state;

in said initial state, transmitting a modifying right request to transit into said wait-for-modifying-right state when the screen modifying date is input from said input part, or, transitting into said absence-of-modifying-right state when a screen modifying request is transmitted from any other remaining of said terminal units;

in said wait-for-modifying-right state, transitting into said presence-of-modifying-right state if no modifying right request is transmitted from any of said other remaining terminal units within a predetermined period of time, or, transitting into said collision state if a modifying right request is transmitted from any of said other remaining terminal units within a predetermined period of time;

in said presence-of-modifying-right state, transitting into said initial state if no screen modifying data is input from said input part within a predetermined period of time;

in said collision state, transitting into said initial state if no screen modifying data is input from said input part within a predetermined period of time; and in said absence-of-modifying-right state, transitting into said initial state of no screen modifying data is transmitted from another of said terminal units within a predetermined period of time.

26. A screen communications system for communicating screen data between a plurality of interconnected terminals, each of said terminals having a display part and an input part, said system comprising:

a first transmitter for transmitting therethrough a modifying right request from any one of said terminals to another terminal or to other remaining terminals; and a second transmitter for transmitting therethrough screen modifying data from said any one terminal to said another terminal or to said other remaining terminals when said any one terminal determines that no modifying request from any of said other remaining terminals has been received thereat within a predetermined amount of time after transmitting said modifying right request;

wherein each terminal comprises:

means for transmitting a modifying right request to said another terminal or to said other remaining terminals each time screen modifying data is input from said input part;

means for receiving a modifying right request transmitted from said transmitting means of any of said other remaining terminals;

means for transmitting said screen modifying data input from said input part;

means for receiving screen modifying data transmitted from any of said other remaining terminals;

means for modifying the content of display of said display part based on said screen modifying data input from said input part or received by said means for receiving screen modifying data; and multi-window control means for dividing said display part into a plurality of display areas, said multi-window control means defining, for at least one of said display areas, a screen to be shared with at least one of said other remaining terminals, wherein said first transmitter includes a communication system having a transmission delay shorter than that of said second transmitter.

27. A screen communications system according to claim 26, wherein said multi-window control means further defines, for at least one of said display areas, a screen to be used only by an associated terminal unit.

28. A screen communications system for communicating screen data between a plurality of interconnected terminals, each of said terminals having a display part and an input part, said system comprising:

a first transmitter for transmitting therethrough a modifying right request from any one of said terminals to another terminal or to other remaining terminals; and a second transmitter for transmitting therethrough screen modifying data from said any one terminal to said another terminal or to said other remaining terminals when said any one terminal determines that no modifying request has been received thereat within a predetermined amount of time after transmitting said modifying right request;

wherein each terminal comprises:
   means for transmitting a modifying right request to said another terminal or to said other remaining terminals each time screen modifying data is input from said input part;
   means for receiving a modifying right request transmitted from said transmitting means of any of said other remaining terminals;
   means for transmitting said screen modifying data input from said input part;
   means for receiving screen modifying data transmitted from any of said other remaining terminals;
   means for modifying the content of display of said display part based on said screen modifying data input from said input part or received by said means for receiving screen modifying data;
   confirming means for confirming if said terminal has a modifying right or not; and
   means for releasing said modifying right of said terminal, wherein
said first transmitter includes a communication system having a transmission delay shorter than that of said second transmitter; and wherein said confirming means comprises:
   first time measuring means for measuring a predetermined first monitoring time period after transmitting said modifying right of said any one terminal to said another terminal or to said other remaining terminals, and
   means for confirming possession of said modifying right thereof when said modifying right request is not received from any of said other remaining terminals during said predetermined first monitoring time period measured by said first time measuring means; and said means for releasing said modifying right comprises:
   second measuring means for measuring a time interval between every input and comparing said measured time interval to a predetermined period of time, said predetermined period of time being a longest input time interval which allows the inputs to be regarded as a continuous and uninterrupted input, and
   means for releasing said modifying right when no input is received during said period of time measured by said second time measuring means, by judging that said transmission of screen modifying data is terminated.

29. A screen communications system according to claim 28, wherein intervals between input operations indicates different series of input.

* * * * *